(12) United States Patent
Martinez

(10) Patent No.: US 8,233,422 B2
(45) Date of Patent: Jul. 31, 2012

(54) RADIO FREQUENCY MULTICASTING

(75) Inventor: Dennis Michael Martinez, Westford, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 196 days.

(21) Appl. No.: 12/698,232

(22) Filed: Feb. 2, 2010

(65) Prior Publication Data
US 2010/0135197 A1 Jun. 3, 2010

Related U.S. Application Data

(62) Division of application No. 11/711,947, filed on Feb. 27, 2007, now Pat. No. 7,839,811.

(51) Int. Cl.
*H04H 20/71* (2008.01)
(52) U.S. Cl. ........ 370/312; 370/328; 370/338; 455/518; 455/519; 455/90.2; 455/73
(58) Field of Classification Search .................. 370/312, 370/328, 338; 455/518, 519, 90.2, 73
See application file for complete search history.

(56) References Cited

U.S. PATENT DOCUMENTS

| | | | |
|---|---|---|---|
| 6,366,771 B1 | 4/2002 | Angle et al. | |
| 6,647,020 B1 * | 11/2003 | Maher et al. | 370/432 |
| 6,894,990 B1 | 5/2005 | Chow et al. | |
| 6,901,058 B2 | 5/2005 | Lalwaney | |
| 6,928,294 B2 | 8/2005 | Maggenti et al. | |
| 6,982,961 B2 | 1/2006 | Refai et al. | |
| 2003/0058827 A1 * | 3/2003 | Chow et al. | 370/338 |
| 2005/0181815 A1 | 8/2005 | Shostak | |
| 2005/0232241 A1 | 10/2005 | Wu et al. | |
| 2005/0259803 A1 | 11/2005 | Khartabil | |
| 2005/0281208 A1 | 12/2005 | Dorenbosch et al. | |
| 2005/0288048 A1 | 12/2005 | Rosen et al. | |
| 2006/0221937 A1 | 10/2006 | Olivier et al. | |
| 2007/0049314 A1 * | 3/2007 | Balachandran et al. | 455/518 |
| 2007/0121604 A1 * | 5/2007 | Chandra et al. | 370/356 |
| 2008/0031275 A1 * | 2/2008 | Janky et al. | 370/466 |
| 2008/0205321 A1 | 8/2008 | Martinez | |
| 2010/0195578 A1 * | 8/2010 | Razdan et al. | 370/328 |

FOREIGN PATENT DOCUMENTS

| WO | WO 01/45310 A1 | 6/2001 |
|---|---|---|
| WO | WO 2007/021586 A2 | 2/2007 |

* cited by examiner

*Primary Examiner* — Ajit Patel
*Assistant Examiner* — Khai M Nguyen
(74) *Attorney, Agent, or Firm* — Fox Rothschild, LLP; Robert J. Sacco

(57) ABSTRACT

A method for radio frequency multicasting and a multicast site architecture are provided. The method includes assigning a different traffic multicast Internet Protocol (IP) address to each of a plurality of groups of LMR users and encapsulating the LMR content within IP packets. The method further includes transmitting the IP packets to one of the plurality of groups of LMR users using at least one of the assigned traffic multicast IP addresses.

13 Claims, 4 Drawing Sheets

RADIO FREQUENCY MULTICASTING

CROSS-REFERENCE TO PRIOR APPLICATIONS

This application is a divisional application of U.S. application Ser. No. 11/711,947 filed on Feb. 27, 2007.

BACKGROUND OF THE INVENTION

This invention relates generally to wireless communication systems, and more particularly, to wireless communication systems providing radio frequency (RF) communication.

Wireless communication systems may provide communication between individual users and/or between groups of users. For example, radio frequency communication between land mobile radios (LMRs) may allow messages to be communicated between two users or between a group of users. In particular, these LMR systems may be designed to support Push-To-Talk (PTT) services, such as a dispatch mode of operation, wherein a dispatcher from a central location communicates with one or more LMRs. In LMR networks, PTT services are often configured for operation in connection with defined or predetermined workgroups. For example, a police department or fire department may be designated as separate workgroups such that communications are provided to all registered members of that workgroup. For communication purposes, workgroups further may be organized into talk groups, which are typically smaller subsets of the workgroups. For example, a particular unit in the police department or fire department may form a workgroup. In operation, radio users and/or dispatchers key up PTT on a talk group. The LMR network is configured such that all members of the workgroup receive the communications being broadcast on a particular talk group (e.g., multicast communication). Additionally, an LMR that is registered, for example, in a police workgroup and that receives police workgroup broadcast communications also may listen in on and receive communications from a fire talk group.

LMR systems also may communicate using Internet Protocol (IP) messages. These IP based systems provide improved interoperability. However, in operation, a single voice stream is unicast to each of multiple users, for example, to each user in a talk group. This unicast transmission of IP messages can heavily load system resources by using a large amount of bandwidth, particularly when a large number of users are participating in a communication. Some systems may not have sufficient capacity to serve all users. Accordingly, communication delays or slow downs may result during group calls. The delays or slow downs may be propagated throughout the network, thereby affecting the overall system and/or communications between others users within the system.

BRIEF DESCRIPTION OF THE INVENTION

In one embodiment, a method for communicating land mobile radio (LMR) content is provided. The method includes assigning a different traffic multicast Internet Protocol (IP) address to each of a plurality of groups of LMR users and encapsulating the LMR content within IP packets. The method further includes transmitting the IP packets to one of the plurality of groups of LMR users using at least one of the assigned traffic multicast IP addresses.

In another embodiment, a method for providing land mobile radio (LMR) radio frequency (RF) communication is provided. The method includes defining a control plane using at least one control multicast Internet Protocol (IP) address. The control plane communicates call control and signaling information to a plurality of LMR units. The method further includes defining a traffic plane using at least one traffic multicast IP address. The traffic plane communicates encapsulated LMR content to at least one of the plurality of LMR units associated with a group of LMR users.

In yet another embodiment, a multicast site architecture for communicating land mobile radio (LMR) content is provided that includes a plurality of communication sites and an LMR over Internet Protocol (IP) interface associated with at least one of the plurality of communication sites. The LMR over IP interface is configured to transmit call control and signaling information to a plurality of LMR units using at least one control multicast IP address and to assign at least one traffic multicast IP address to communicate LMR content between a group of LMR users.

DETAILED DESCRIPTION OF THE INVENTION

Various embodiments of the invention include a system for providing wireless communication, and more particularly, radio frequency (RF) land mobile radio (LMR) communication to a plurality of users. More particularly, wireless communication of LMR content configured as Internet Protocol (IP) messages is provided. However, the various embodiments are not limited to a particular communication protocol or format. For example, even though the various embodiments may be described in connection with communicating LMR content over a particular cellular system, for example, a 3G cellular system such as a Universal Mobile Telecommunications System (UMTS) and/or an Evolution Data Only, Evolution Data Optimized (EV-DO) system, or a 2.5G cellular system, such as, a General Packet Radio Service (GPRS) system, the embodiments are not limited to these systems. The various embodiments may, for example, be implemented in connection with Global System for Mobile Communication (GSM), Enhanced Data Rates for GSM Evolution (EDGE), among others, and in general, may be implemented in connection with communicating LMR content over any type of IP system (e.g., Voice over IP (VoIP)) or cellular IP system. Essentially, the various embodiments provide a system of communicating (e.g., multicasting) any content (not limited to LMR content) using LMR over IP.

It should be noted that when reference is made herein to LMR content, this refers generally to any type or kind of LMR voice and/or data content, and may define particular LMR services, operations, controls, etc. For example, the LMR content may include, but is not limited to, voice data, emergency signal data, control data relating to selecting a particular talk group, LMR data for transfer between a radio unit and a server, reprogramming data (e.g., software upgrade data), etc.

Figure 1:
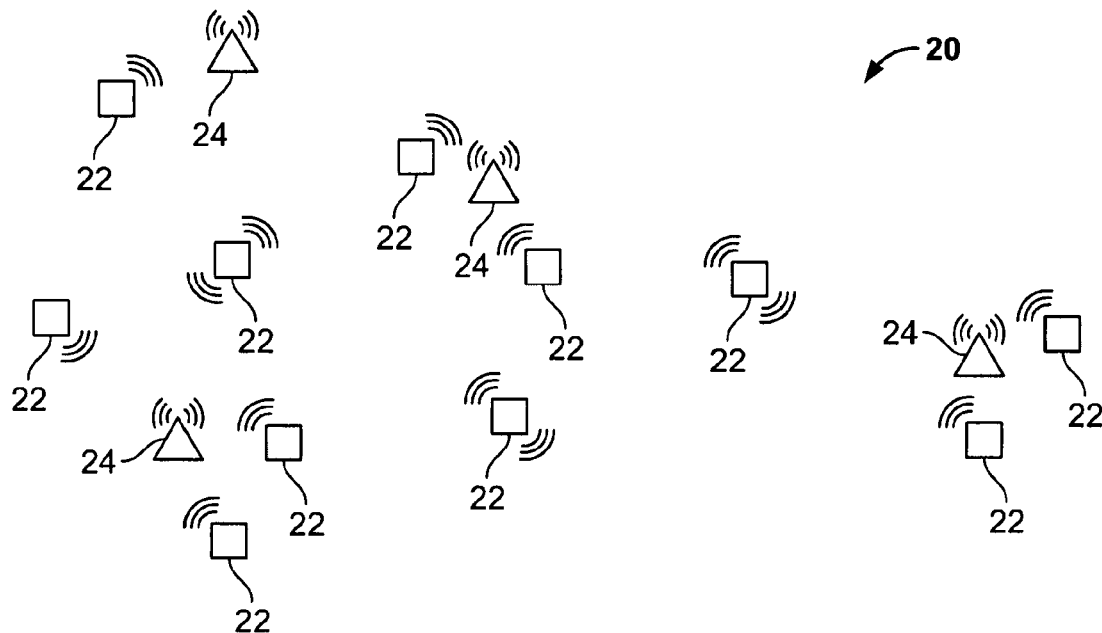
FIG. 1 is a block diagram of a land mobile radio (LMR) communication system in connection with which various embodiments of the invention may be implemented.

As shown in FIG. 1, a wireless communication system, and more particularly, an LMR communication system 20 constructed according to various embodiments of the invention provides LMR over IP communication between a plurality of LMR units 22 (or LMR terminals), which may be configured for mobile operation, such as located in various vehicles. However, the LMR units 22 also may be fixed units, such as dispatch consoles or may be other types of mobile units, such as, handheld units. Communication between the LMR units 22 may be provided, for example, via an LMR over IP (e.g., LMR over third generation (3G) cellular) network having a communication coverage area defined by a plurality of communication base stations 24 and associated communication towers. Within the LMR coverage area, Radio Frequency (RF) coverage is provided by each of the base stations 24. The RF coverage may overlap. Additionally, the LMR units 22 may communicate directly with each other or via the LMR over IP network or with a group of LMR units 22. The LMR units 22 may subscribe to or be registered with one or more workgroups or talk groups such that the LMR units 22 receive communications from different groups or sub-groups of other LMR units 22, respectively.

Figure 2:
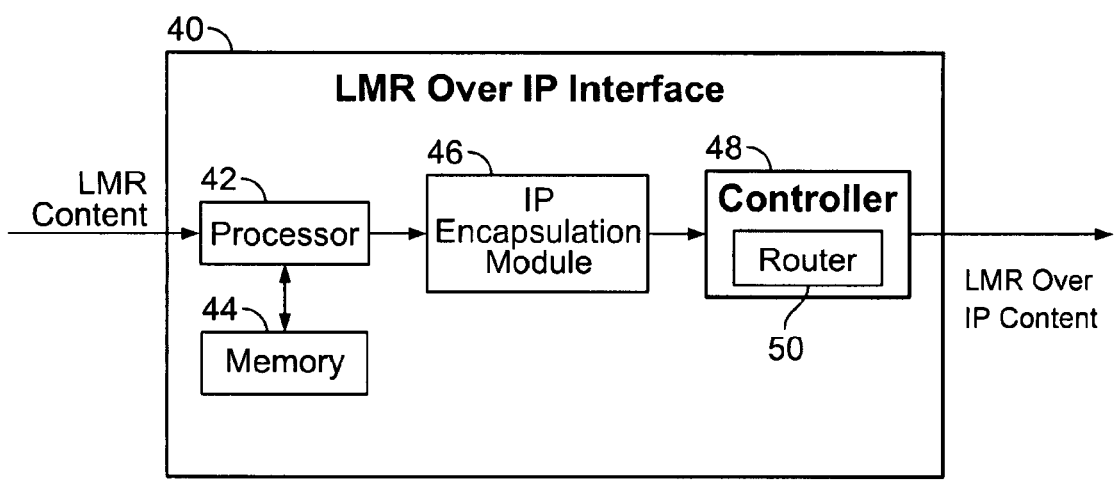
FIG. 2 is an LMR over Internet Protocol (IP) interface constructed in accordance with an embodiment of the invention.

In the various embodiments, as shown in FIG. 2, an LMR over IP interface 40 may be provided in connection with the LMR communication system 20 (shown in FIG. 1), for example, at a central facility or connected to one or more base stations 24 (shown in FIG. 1). The LMR over IP interface 40 may be provided, for example, as a separate unit (e.g., stand alone module), a card for connection to a server within the LMR communication system 20 or software for downloading to a server within the LMR communication system 20.

Figure 3:
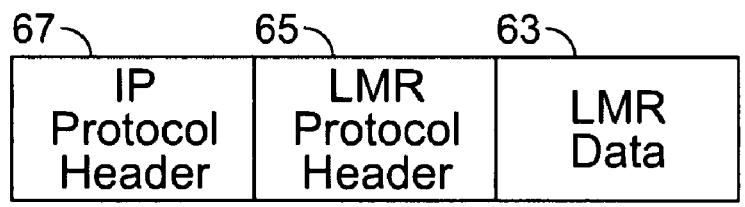
FIG. 3 is a block diagram illustrating LMR content formed in accordance with an embodiment of the invention.

The LMR over IP interface 40 includes a processor 42 for processing received LMR content for communication within the infrastructure of the LMR communication system 20. In particular, and as described in more detail below, the processor 42 may receive LMR content in LMR formats such as Project 25 (P25), Terrestrial Trunked Radio (TETRA) and proprietary formats such as Enhanced Digital Access Communications System (EDACS) and OpenSky. The LMR content alternatively may be IP encapsulated. For example, the LMR content may be encapsulated in a Real-Time Transport Protocol (RTP) for communication using IP network standards. Thus, as shown in FIG. 3, the LMR content 61 communicated using various embodiments of the invention (e.g., received by the LMR over IP interface 40 or output by the LMR over IP interface 40) generally may include an LMR data portion 63 that is LMR encoded and IP capsulated such that the LMR content 61 includes an LMR protocol header 65 and an IP protocol header 67. It should be noted that the IP protocol header 67 may include one or more IP addresses identifying, for example, addresses, such as multicast IP addresses, of groups of LMR units 22 (shown in FIG. 1) to which the LMR data 63 is to be communicated (e.g., multicasted). It further should be noted that the LMR content 61 may be configured in different formats using different protocols or standards as desired or needed.

In the various embodiments, the LMR over IP interface 40 processes LMR content such that the LMR content is essentially encapsulated, for example, encapsulated such that LMR over 3G cellular communications may be provided using less channels or frequencies. For example, the LMR content may be encapsulated using a packet switching protocol as described in co-pending U.S. patent application entitled "System Providing Land Mobile Radio Content Using a Cellular Data Network" having Ser. No. 11/130,975, assigned to the assignee of the present application and incorporated herein by reference in its entirety. The processor 42 may determine different groups of destination LMR units 22 to which the LMR content is to be communicated. The processor 42 is also connected to a memory 44 that may store, for example, the IP addresses (e.g., multicast addresses) of different groups of LMR units 22, for example, workgroups, talk groups, LMR units 22 within a particular organization or entity, etc. The processor 42 is also connected to an IP encapsulation module 46 configured to encapsulate the LMR content in, for example, an IP wrapper that may be formatted and addressed to a plurality of LMR units 22 as identified in the memory 44 using, for example, one or more multicast IP addresses as described below. The IP encapsulation module 46 is connected to a controller 48 that may include a router 50. The destination of the encapsulated LMR content is controlled by the controller 48. It should be noted that the LMR content may be configured for communication with an IP based network to another LMR over IP interface 40 or to a plurality of LMR units 22 using a single RF channel or frequency as described in more detail below.

Figure 4:
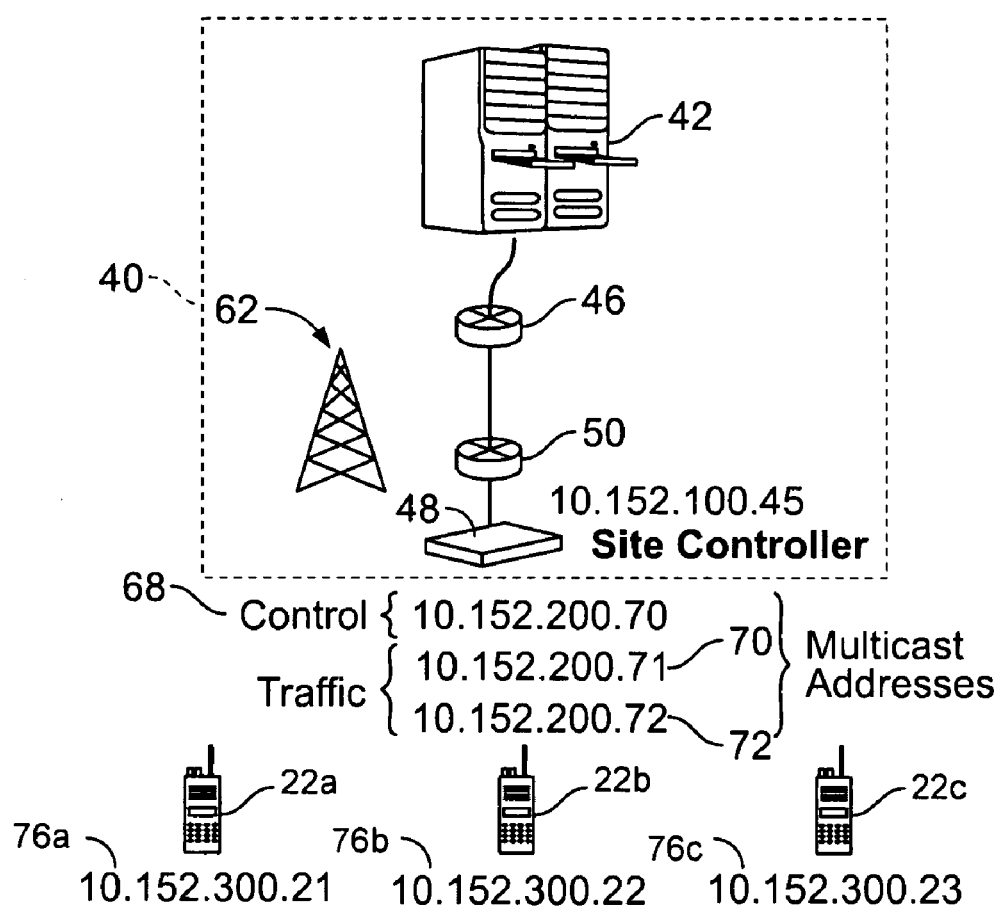
FIG. 4 is a diagram of a multicast site architecture constructed in accordance with an embodiment of the invention.

In one embodiment, a multicast site architecture 60 as shown in FIG. 4 is provided that includes the LMR over IP interface 40 and wherein the processor 42 is a server or other unit that may be located at a central location or as part of the base station 24 (shown in FIG. 1) having one or more communication towers 62. In this embodiment, the processor 42 is connected to the IP encapsulation module 46 that is connected to the controller 48, for example, a site controller via the router 50.

Figure 5:
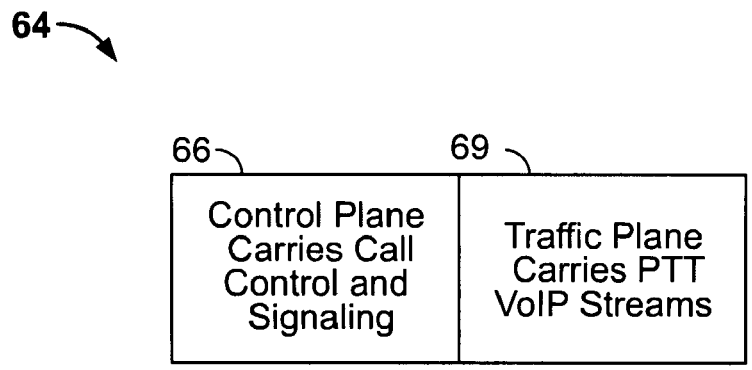
FIG. 5 is a block diagram illustrating a logical communication structure formed in accordance with an embodiment of the invention.

The multicast site architecture 60 operates to define a logical communication structure 64 as shown in FIG. 5. The logical communication structure 64 includes a control plane 66 that is configured to carry (e.g., communicate or transmit) call control and signaling information. This call control and signaling information is provided by the controller 48 and may include, for example, a control stream of transmitted data that identifies or notifies LMR units 22 within the range of the communication tower 62 of all the active calls, such as, all the ongoing open communications, as well as, for example, priority information relating to the priority of incoming and outgoing calls, timing information, frequency information, channel information, etc. For example, the control plane 66 may communicate information over a control multicast IP address 68 that a first talk group (TG1), such as a police department talk group, is communicating on a first traffic multicast IP address 70 and that a second talk group (TG2), such as another police department talk group (e.g., from a different municipality) or a fire department talk group, is communicating on a second traffic multicast IP address 72. These traffic multicast IP addresses 70 and 72 allow communication as part of a traffic plane 69 of the logical communication structure 64 such as allowing LMR units 22 to, for example, receive and decode voice calls for a particular talk group, work group, etc. Essentially, a talk group, workgroup or other communication unit is mapped into and assigned (associated with) a traffic multicast IP address at each site, for example, at each base station 24. Accordingly, in one embodiment, at each communication site these groups have different traffic multicast IP addresses. The LMR units 24 may subscribe to or communicate using one or more traffic multicast IP addresses assigned to one or more talk groups, workgroups, etc. to which that LMR unit 24 is registered.

Thus, the controller 48, which may be a site controller, is assigned an IP address for communicating with the router 50 (on both the control plane 66 and traffic plane 69) to provide inbound signaling from subscribers, namely LMR units 24. The controller 48 is also assigned a multicast IP address, namely the control multicast IP address 68, for example, within a Universal Mobile Telecommunications System (UMTS) subscriber domain that relays the control plane over the air to the LMR units 22. Other domains may be used, for example, a Global System for Mobile Communications (GSM) subscriber domain, an Enhanced Data Rates for GSM Evolution (EDGE) subscriber domain, an Evolution-Date Optimized (EV-DO) subscriber domain and/or a combination thereof. The controller 48 also provides a plurality of traffic multicast IP addresses (e.g., different traffic multicast IP addresses), such as the traffic multicast IP addresses 70 and 72, for example, also within the UMTS subscriber domain that carry the traffic plane 69 over the air to the LMR units 22. It should be noted that each LMR unit 22 (illustrated as separate LMR units 22a, 22b and 22c in FIG. 4) is assigned an individual IP address 76a, 76b and 76c, respectively. Also, it should be noted that the traffic multicast IP addresses 70 and 72 may be assigned to the controller 48 from a central location and stored in the memory 44 (shown in FIG. 2) or alternatively assigned by the controller 48.

Each of the LMR units 22a, 22b and 22c is programmed to scan for one or more control multicast IP addresses, such as the control multicast IP address 68. Upon detecting the control multicast IP address 68 and establishing a communication link as described in more detail herein, the controller 48 can determine the groups (e.g., talk groups) to which the LMR units 22a, 22b and 22c are subscribers and/or are authorized to access. For example, based on the IP address 76a of the LMR unit 22a, the controller 48 may determine that the LMR unit 22a is a subscriber only to the first talk group (TG1) that is communicating on the first traffic multicast IP address 70. The controller 48 also may determine that based on the IP address 76b of the LMR unit 22b, that the LMR unit 22b is a subscriber only to the second talk group (TG2) that is communicating on the second traffic multicast IP address 72. The controller 48 further may determine based on the IP address 76c of the LMR unit 22c that the LMR unit 22c is a subscriber to both talk groups (TG1 and TG2). Accordingly, the LMR unit 22a may communicate with other LMR units 22 (e.g., a group of LMR users) that are subscribers to TG1 using the first traffic multicast IP address 70. Similarly, the LMR unit 22b may communicate with other LMR units 22 (e.g., a group of LMR users) that are subscribers to TG2 using the second traffic multicast IP address 72. LMR unit 22c may communicate with one or more groups of other LMR units 22 (e.g., different groups of LMR users) that are subscribers to either TG1 or TG2. Thus, LMR units 22a and 22b can communicate with one group of users, namely TG1 or TG2, respectively, and LMR unit 22c can communicate with one or more groups of users, namely TG1 and/or TG2.

Figure 6:
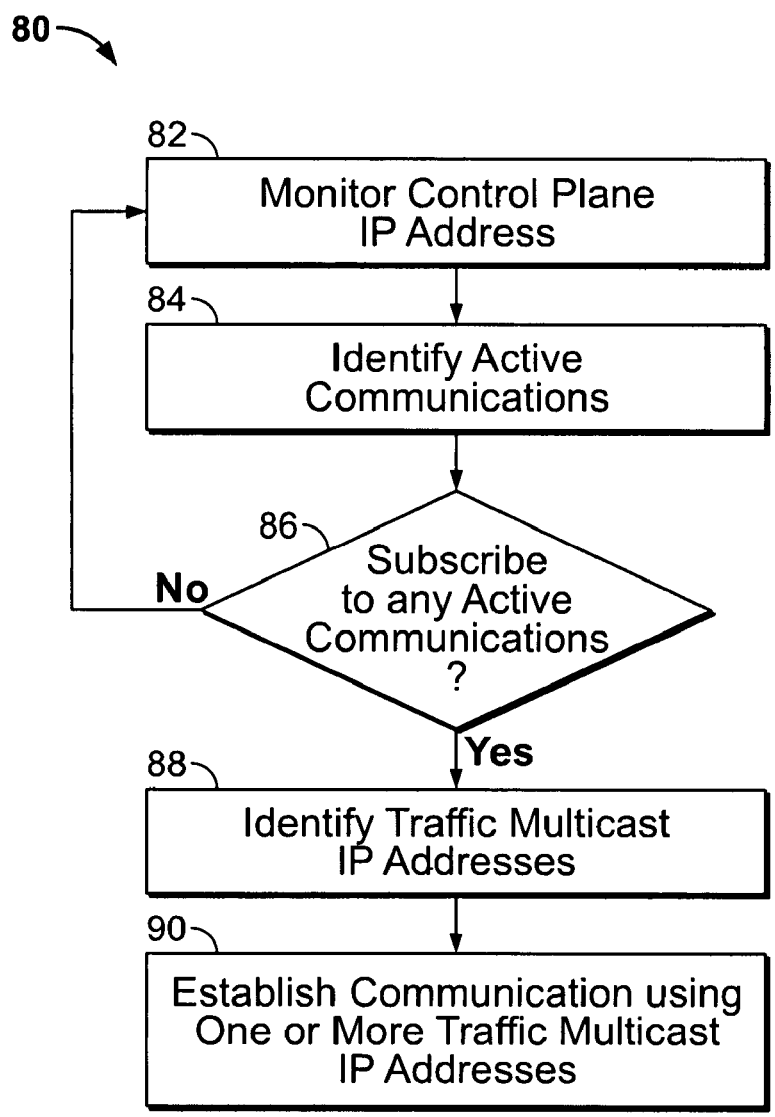
FIG. 6 is a flowchart of a method for communicating LMR content in accordance with an embodiment of the invention.

Thus, in operation, an LMR unit 22 may communicate with a plurality of other LMR units 22, for example, using a Push-To-Talk (PTT) of the LMR unit 22 to transmit information to the other LMR units 22. The plurality of LMR units 22 may define, for example, a talk group (e.g., a police or fire unit talk group). The LMR over IP interface 40 controls and processes the communications for transmission to and from the plurality of LMR units 22 using the multicast site architecture 60. More particularly, as shown in FIG. 6, a method 80 for communicating LMR content, for example, multicasting LMR data, includes monitoring control plane IP addresses at 82. This includes, for example, LMR units monitoring control streams from one or more communication sites (e.g., base stations) to scan for active calls on the one or more communication sites. The LMR units are programmed to monitor for control multicast IP addresses associated with, for example, communication sites within a network. The control streams at 84 identify, for example, one or more talk groups, workgroups, etc. that are communicating via the communication tower. It should be noted that an active communication may be one in which a communication link or channel is established and data/voice is currently being communicated or when data/voice is not being communicated as long as subscribers are connected to that link or channel (e.g., no current voice communication).

A determination is then made at 86 as to whether the LMR unit subscribes to any of the one or more talk groups, workgroups, etc. having an active call. For example, a determination is made as to whether the LMR unit has an individual IP address that is included in any of the one or more talk groups, workgroups, etc. and that may be stored within the site controller. If a determination is made at 86 that the LMR unit is not a subscriber to any of the one or more talk groups, workgroups, etc, then the control plane is again monitored at 82. If a determination is made at 86 that the LMR unit is a subscriber to one or more of the talk groups, workgroups, etc., then corresponding traffic multicast IP address(es) are identified. For example, if the LMR unit is a subscriber to one or more of the talk groups, workgroups, etc., the traffic multicast IP addresses assigned to those one or more talk groups, workgroups, etc. is communicated to the LMR unit. The traffic multicast IP addresses may, for example, be mapped to the one or more the talk groups, workgroups, etc. in a table stored in the site controller. The one or more talk groups, workgroups, etc. are each assigned a traffic multicast IP address. The traffic multicast IP address for each of the one or more talk groups, workgroups, etc. may be different for each communication site of may be the same for different communication sites. Thus, for example, in the multicast site architecture a different traffic multicast IP address assigned to the same talk group may be communicated to each communication site as three different traffic multicast IP addresses. Alternatively, the same traffic multicast IP address may be assigned to the talk group such that the same traffic multicast IP address is communicated to the plurality of communication sites.

Thereafter, at 90, communication is established between the LMR unit and other LMR units on one or more active calls. For example, the LMR unit is enabled to receive communications from the one or more talk groups, workgroups, etc. having active calls and to which the LMR is a subscriber. The LMR unit, for example, an LMR radio can then transmit/encode and/or receive/decode voice calls using the traffic multicast IP addresses. For example, the LMR unit may process incoming LMR content by decoding the LMR content using known LMR decoding techniques to generate an LMR output (e.g., voice communication).

Figure 7:
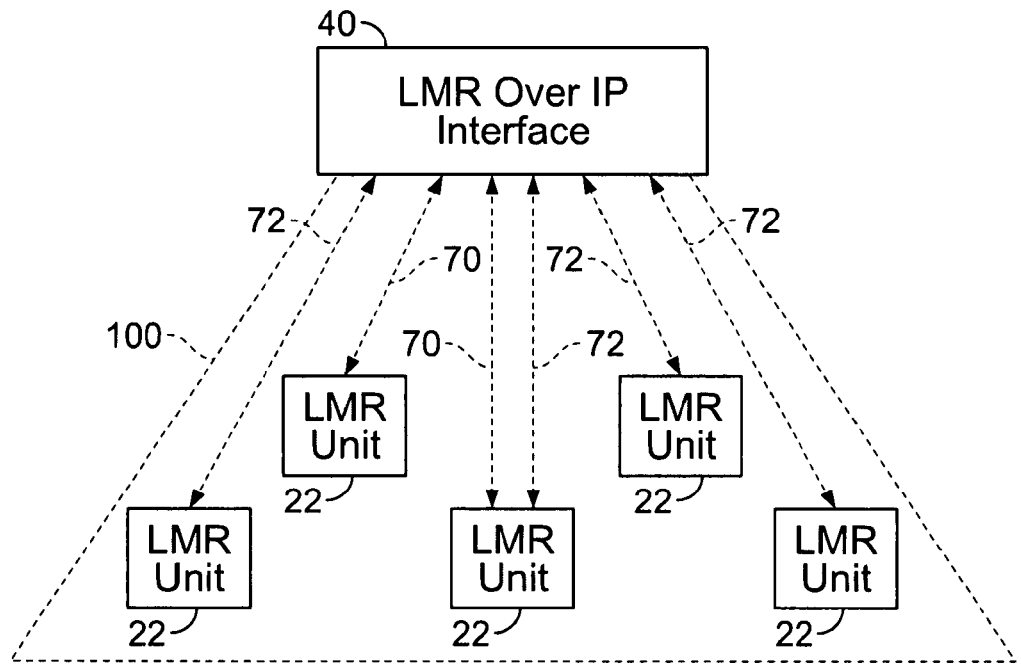
FIG. 7 is a block diagram illustrating the communication of LMR content in accordance with an embodiment of the invention.

Thus, communications between a plurality of LMR units may be provided on a single frequency that is based on, for example, an IP address for a particular talk group or workgroup. Essentially, a multicast type of LMR communication or trunking by IP address is provided using a single frequency or channel. The same LMR content may be delivered using a single frequency or channel to a plurality of users communicating via a plurality of LMR units as shown in FIG. 7. The LMR content (e.g., PTT message) received by the LMR over IP interface 40 from an LMR unit 22 is processed as described herein. More particularly, LMR units within a communication region 100 receive control plane information. If an LMR unit 22 subscribes to a talk group, workgroup, etc. that has an active call the traffic multicast IP address for that active call is communicated to the LMR unit 22 enabling the LMR unit 22 to receive and/or transmit using that traffic multicast IP address, for example, the traffic multicast IP addresses 70 or 72. Thus, communications between a plurality of LMR units 22 is provided via a single frequency. For example, a single LMR message may be multicast to a plurality of LMR units 22 using a single multicast IP address over a single radio frequency from one or more base stations, such as from each of a plurality of RF sites.

Figure 8:
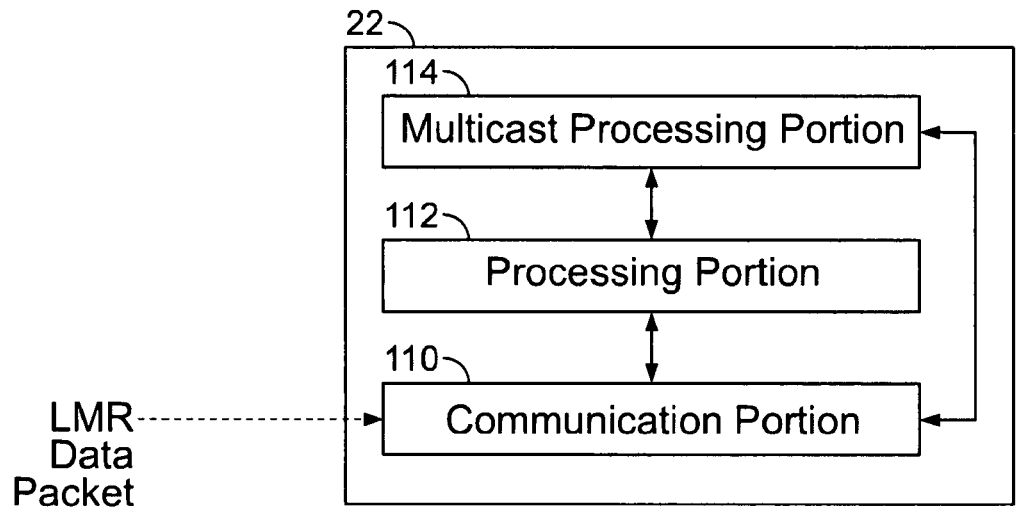
FIG. 8 is a block diagram of an LMR unit constructed in accordance with an embodiment of the invention.

As shown in FIG. 8, the LMR units 22 may include a communication portion 110 that provides transmission and reception to and from the LMR unit 22. For example, the communication portion 110 may include a transmitter, receiver, etc. provided in any known manner to communicate using LMR or other wireless standards (e.g., cellular). The communication portion 110 is connected to a processing portion 112 that may include LMR encoding and decoding processors as are known. The communication portion 110 and processing portion 112 are also each connected to a multicast processing portion 114 configured to establish and provide communications in the multicast site architecture 60 of the various embodiments of the invention as described herein. The LMR unit 22 also may include other components as are known, for example, a microphone, speaker, display, user inputs, etc. (all not shown).

Thus, various embodiments of the invention communicate LMR content to a plurality of LMR units using a single frequency or channel, thereby reducing the amount of system resources needed for the transmission. Accordingly, an LMR message to be communicated to, for example, a plurality of users in a talk group, is transmitted using a single frequency or channel wherein the LMR message is communicated using a multicast IP address having one or more subscribers.

The various embodiments or components, for example, the LMR communication systems, networks or controllers therein, may be implemented as part of one or more computer systems, which may be separate from or integrated with the LMR communication system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It also should be noted that the various embodiments of the invention also may provide different and/or additional functionality. For example, end-to-end encryption may be performed, thereby eliminating the use of intervening encryption equipment and the security risk encountered by having such intervening equipment with access to encryption keys. Further, various embodiments of the invention may provide end-to-end digital voice coding, thereby eliminating the use of intervening transcoding and transcription equipment and hence the fidelity loss encountered when one format is converted to another format.

While the invention has been described in terms of various specific embodiments, those skilled in the art will recognize that the various embodiments of the invention can be practiced with modification within the spirit and scope of the claims.

What is claimed is:

1. A multicast site architecture for communicating land mobile radio (LMR) content, said multicast site architecture comprising:

a plurality of communication sites; and an LMR over Internet Protocol (IP) interface associated with at least one communication site of said plurality of communication sites, said LMR over IP interface configured to:

transmit call control and signaling information to a plurality of LMR units using at least one control multicast IP address, assign a different traffic multicast IP address to each of a plurality of talkgroups for communicating LMR content between LMR units of said plurality of LMR units which subscribe to at least one of said plurality of talkgroups, identify at least one talkgroup of said plurality of talkgroups having an active communication within said at least one communication site, determine if an LMR unit, which is not currently participating in said active communication, is a subscriber to said at least one talkgroup, identify a traffic multicast IP address that is assigned to said at least one talkgroup, and communicate said traffic multicast IP address to said LMR unit only if it is determined that said LMR unit is a subscriber to said talkgroup.

2. A multicast site architecture in accordance with claim 1, wherein said LMR over IP interface is further configured to assign an individual IP address to each LMR unit of said plurality of LMR units.

3. A multicast site architecture in accordance with claim 2, wherein said LMR over IP interface is further configured to determine if said LMR unit is a subscriber to said at least one talkgroup based on said individual IP address of said LMR unit.

4. A multicast site architecture in accordance with claim 3, wherein said LMR over IP interface is further configured to communicate to said LMR unit said traffic multicast IP address that is assigned to said identified talkgroup.

5. A multicast site architecture in accordance with claim 4, wherein said traffic multicast IP address assigned to said identified talkgroup is different for at least two of said plurality of communication sites.

6. A multicast site architecture in accordance with claim 4, wherein said plurality of communication sites are configured to communicate said LMR content to said LMR units which subscribe to said identified talkgroup using said traffic multicast IP address assigned to said identified talkgroup.

7. A multicast site architecture in accordance with claim 6, wherein said plurality of communication sites are further configured to communicate said LMR content to said LMR units which subscribe to said identified talkgroup over a single radio frequency.

8. A multicast site architecture in accordance with claim 1, wherein said LMR content is formatted in accordance with a Project 25 format, a terrestrial trunked radio format, an enhanced digital access communications system format or an Opensky format.

9. A multicast site architecture in accordance with claim 1, wherein said LMR content is IP encapsulated with an IP protocol header.

10. A multicast site architecture in accordance with claim 9, wherein said IP protocol header comprises at least one of said traffic multicast IP addresses.

11. A multicast site architecture in accordance with claim 1, wherein said LMR over IP interface is further configured to encapsulate said LMR content in an IP wrapper formatted and addressed to said plurality of LMR units using at least one of said traffic multicast IP addresses.

12. A multicast site architecture in accordance with claim 1, wherein said control and signaling information identifies said at least one talkgroup and at least one traffic multicast IP address of said traffic multicast IP addresses that is assigned to said at least one talkgroup.

13. A multicast site architecture in accordance with claim 12, wherein said control and signaling information further comprises call priority information, timing information, frequency information and channel information.

* * * * *